United States Patent
Maul et al.

(10) Patent No.: US 10,132,700 B2
(45) Date of Patent: Nov. 20, 2018

(54) FBG STRAIN SENSOR FOR CURVED SURFACES

(71) Applicant: HOTTINGER BALDWIN MESSTECHNIK GMBH, Darmstadt (DE)

(72) Inventors: Jochen Maul, Mainz (DE); Tobias Kipp, Rödermark (DE); Bernd Günther, Karlsruhe (DE)

(73) Assignee: HOTTINGER BALDWIN MESSTECHNIK GMBH, Darmstadt (DE)

( * ) Notice: Subject to any disclaimer, the term of this patent is extended or adjusted under 35 U.S.C. 154(b) by 0 days.

(21) Appl. No.: 14/358,314

(22) PCT Filed: Nov. 15, 2012

(86) PCT No.: PCT/DE2012/001095
§ 371 (c)(1),
(2) Date: May 15, 2014

(87) PCT Pub. No.: WO2013/071914
PCT Pub. Date: May 23, 2013

(65) Prior Publication Data
US 2014/0311250 A1  Oct. 23, 2014

(30) Foreign Application Priority Data

Nov. 15, 2011  (DE) .................. 10 2011 118 525
Nov. 15, 2011  (DE) .................. 10 2011 118 526
Nov. 15, 2011  (DE) .................. 10 2011 118 527

(51) Int. Cl.
*G02B 6/00* (2006.01)
*G01L 1/24* (2006.01)
*G01B 11/16* (2006.01)

(52) U.S. Cl.
CPC .............. *G01L 1/246* (2013.01); *G01B 11/18* (2013.01)

(58) Field of Classification Search
None
See application file for complete search history.

(56) References Cited

U.S. PATENT DOCUMENTS 8,405,822 B2  3/2013  Kreuzer et al.
2002/0009252 A1*  1/2002  Maron et al. ................... 385/12
(Continued)

FOREIGN PATENT DOCUMENTS

JP   2003279760 A   10/2003
WO   WO2005/114099 A1   12/2005
WO   WO2008/101657 A1   8/2008

OTHER PUBLICATIONS

International Search Report issued by the European Patent Office in International Application PCT/DE2012/001095; dated Feb. 25, 2013.

*Primary Examiner* — Chris Chu
(74) *Attorney, Agent, or Firm* — Henry M. Feiereisen LLC

(57) ABSTRACT

An FBG strain sensor for measuring strains to curved surfaces, includes a fiber which is fixed between two securing elements whose undersides are designed as adhesive surfaces, the optical fiber and these securing elements being embedded in a protective compound which consists of a soft silicone rubber or a plastic that has comparable mechanical properties, and the fiber being embedded between an upper and a lower thin sliding film or a sliding tube that consists of Teflon or of a plastic which has a low friction coefficient comparable to Teflon, the underside of the lower sliding film or the lower external surface-line of the sliding tube lying in a plane with the adhesive surfaces of the securing elements.

2 Claims, 7 Drawing Sheets

(56) References Cited

U.S. PATENT DOCUMENTS

| | | | |
|---|---|---|---|
| 2002/0092976 A1* | 7/2002 | Sugai et al. | 250/227.14 |
| 2005/0129347 A1* | 6/2005 | Saito | G02B 6/4471 |
| | | | 385/14 |
| 2008/0219617 A1 | 9/2008 | Kuang et al. | |
| 2010/0300209 A1 | 12/2010 | Kreuzer et al. | |
| 2012/0051694 A1* | 3/2012 | Russert | G02B 6/4249 |
| | | | 385/33 |
| 2012/0070112 A1* | 3/2012 | Mitachi | A61B 5/113 |
| | | | 385/13 |
| 2012/0274923 A1 | 11/2012 | Kreuzer et al. | |
| 2012/0281954 A1 | 11/2012 | Kreuzer et al. | |

\* cited by examiner

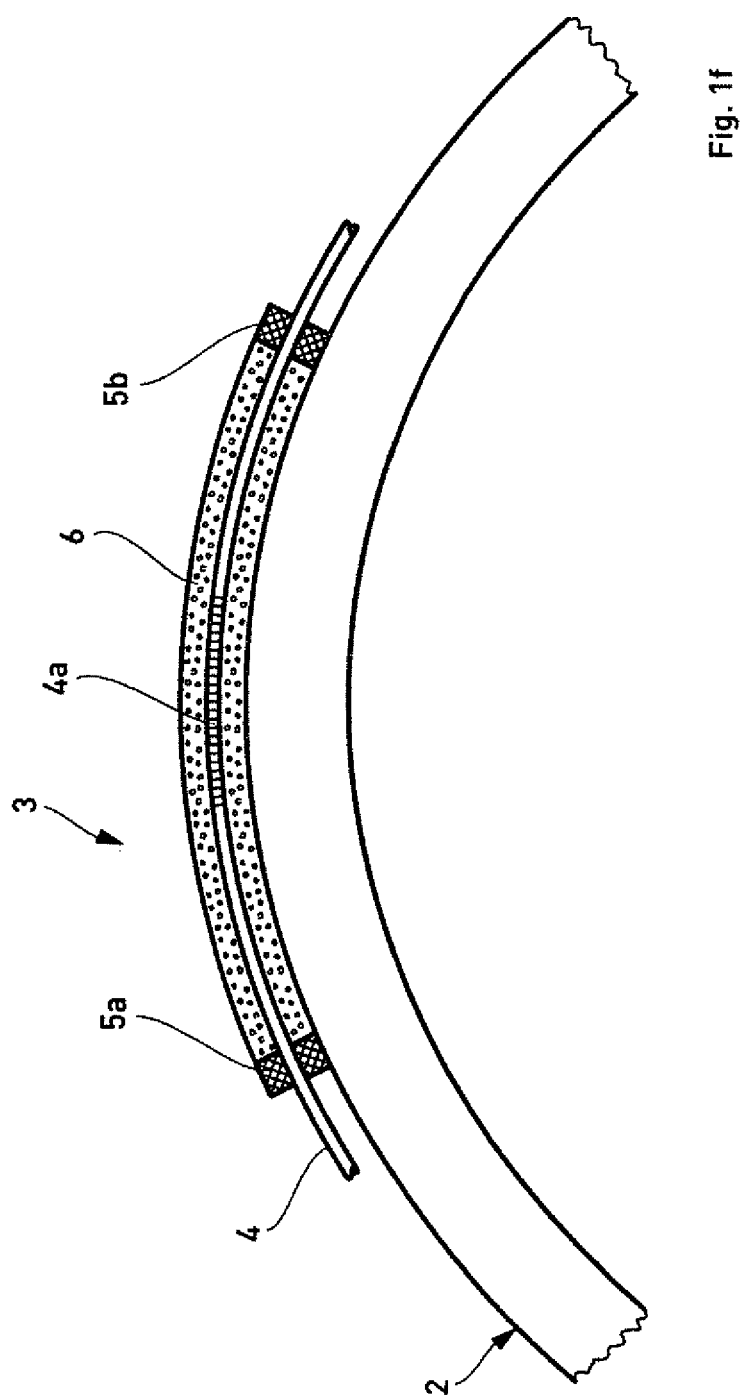

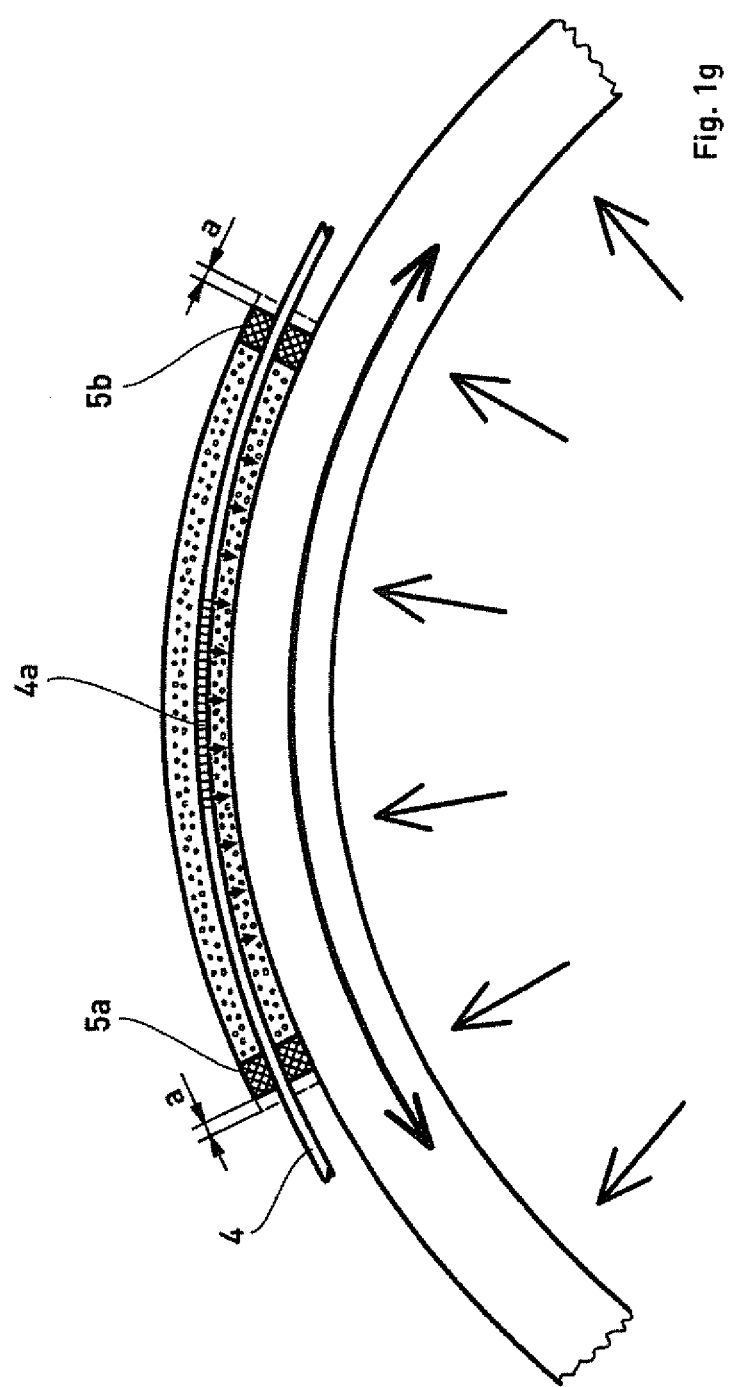

FBG STRAIN SENSOR FOR CURVED SURFACES

CROSS-REFERENCES TO RELATED APPLICATIONS

This application is the U.S. National Stage of International Application No. PCT/DE2012/001095, filed Nov. 15, 2012, which designated the United States and has been published as International Publication No. WO 2013/071914 A1 and which claims the priority of German Patent Application, Serial No. 10 2011 118 527.9, filed Nov. 15, 2011, German Patent Application, Serial No 10 2011 118 527.0, filed Nov. 15, 2011, and German Patent Application, Serial No. 10 2011 118 527.2, filed Nov. 15, 2011 pursuant to 35 U.S.C. 119(a)-(d).

BACKGROUND OF THE INVENTIONS

The present invention relates to a strain sensor with an optical fiber, which has a fiber Bragg lattice, in the following referred to as FBG strain sensor. The invention is suited to accurately measure a strain also on curved objects.

Strain sensitive sensors, which are fastened on material surfaces to be investigated are known as so-called metal foil DMS or FBG fiber sensors. A metal DMS essentially consists of a plastic carrier foil on which a thin meander-shaped metal foil strip is fastened over its entire surface. For detecting strain, the plastic carrier foil is glued onto the material surface to be investigated. The use of a plastic foil as sensor carrier is necessary because only such an arrangement allows application of DMS in a defined manner. An electrically insulated application of the very thin metal foil without the relatively stable plastic foil is not practicable outside laboratory conditions.

In analogy to these metal foil DMS, FBG sensors were developed, which as essential component have a glass fiber with a fiber Bragg lattice, in the following referred to as FBG. This glass fiber also has to be fastened on the material surface to be investigated. The fact that the glass fiber is thin and fragile also poses problems during handling. Therefore, a sensor carrier had to be developed in order to make the FBG sensor less sensitive to rough praxis conditions. Such sensors are described in the documents JP 2003 279760 A and WO 2008/101657 A1. Embedding the sensitive fiber with the FBG into a soft plastic compound enables handling of the sensor and with this makes it suitable for use in praxis. The FBG sensor described in the document WO 20081101657 A1 has a two-point force introduction which results in a significantly greater measuring accuracy compared to FBG sensors which are applied over their entire surface. With this type of sensor, strains can be precisely measured on even surfaces. In contrast to metal foil DMS however, problems arise during measurements with FBG sensors on curved surfaces, which are explained by way of FIG. 1a to 1g.

FIGS. 1a-1c show a conventional metal foil DMS, which is glued onto a curved material surface, wherein FIG. 1a shows a perspective view of the curved material surface with a DMS application. FIG. 1b shows the side view of FIG. 1a and FIG. 1c shows an enlarged section of FIG. 2b.

When the material is strained as a result of the influence of force or temperature as shown in FIG. 1c by the double arrow A1, the fastening of the carrier foil over the entire surface by gluing onto the material causes the strain to be transmitted evenly to the metal foil which is connected over its entire surface with the carrier foil and with this the metal foil is also strained to the corresponding degree. Insofar the material strain is transmitted to the metal foil DMS almost error-free as indicated with the double arrow A2 in FIG. 1c.

However, an FBG sensor with a two-point force introduction involves a different type of strain transmission, which is explained in the following. FIGS. 1d and 1e show a longitudinal sectional view and a cross sectional view of an FBG sensor fastened on a material according to the document WO 2008/101657 A1, which is constructed as follows: A glass fiber with an FBG is held between two rigid fastening elements and is embedded in a soft plastic, for example silicone rubber. The two rigid fastening elements are glued onto the material surface to be investigated. The soft plastic preferably serves for protecting the section of the glass fiber, which section is provided with the FBG, from interfering forces, i.e., lateral forces, and for improving the overall handling of the FBG sensor during application. However, when an FBG sensor with this construction is used on a curved surface, effects occur which lead to measuring errors. The causes for this are explained in the following by way of FIGS. 1f-1g.

FIG. 1f shows the sensor applied onto a curved material surface according to the document WO 2008/101657 A1, and FIG. 1f shows the manner in which the glass fiber follows a strain of the material surface. The strain of the material surface is indicated by the double arrow in the material to be monitored. As a result of the strain of the material surface the distance between the two fastening elements is increased by the lengths a+a, i.e., the fiber is strained by the length 2a. Because the fiber is only clamped in the two fastening elements it is pulled in the direction of the material surface, i.e., the plastic presses indiscriminately onto the FBG. In addition this movement of the fiber results in falsified transmission of the actual strain of the material surface onto the FBG, so that a measuring error occurs which depends on the radius of curvature of the material surface.

Therefore it was found that an accurate strain measurement on curved surfaces is neither possible with a sensor according to JP 2003 279760 A nor with the sensor WO 2008/101657 A1.

SUMMARY OF THE INVENTION

It is therefore an object of the invention to provide an FBG sensor with a carrier body which has a high measuring accuracy on curved surfaces, can be handled well and can be produced cost effectively.

According to one aspect of the invention this object is solved with an FBG sensor with an optical fiber, which has an FBG, and is fixed between two fastening elements. The bottom sides of the fastening elements are configured as adhesive surfaces, which are glued onto the material surfaces to be investigated. Further the optical fiber and the fastening elements are embedded in a protective compound made of a soft silicone rubber or a plastic with comparable mechanical properties. The fiber is embedded between an upper and a lower thin sliding foil made of Teflon or a plastic with comparably low friction coefficient, wherein the bottom side of the lower sliding foil lies in a plane with the adhesive surfaces According to another aspect of the invention, the FBG sensor with an optical fiber, which has an FBG, is fixed between two fastening elements. The bottom sides of the fastening elements are configured as adhesive surfaces, which are glued to the material surface to be investigated. Further, the optical fiber and the fastening elements are embedded in a protective compound made of a soft silicone rubber or a plastic with comparable mechanical properties. The fiber is enclosed with a thin sliding tube made of Teflon or a plastic with low friction coefficient comparable to that of Teflon, wherein the lower external surface-line of the sliding tube lies in a plane with the adhesive surfaces.

An FBG sensor with the construction according to the invention also has a significantly smaller measuring error on a curved surface than a sensor arrangement according to JP 2003 279760 A or WO 2008/101657 A1. This is attributable to two effects:

When the fiber is strained it cannot move in the direction of the workpiece surface because it is already supported on the lowest line of the workpiece surface and is only separated from this line by the thin sliding foil. Because this sliding layer has a very low friction coefficient, almost no slip-stick effects are generated. Further, no stick-slip effects result from an influence of the protective compound because the protective compound does not come into contact with the FBG but is instead separated by the upper sliding foil from the protective compound.

According to another advantageous feature of the Invention, the sliding foils are welded or glued together at their borders and the upper sliding foil is glued together with the protective compound.

According to another advantageous feature of the invention, the sliding tube is 4 glued together with the protective compound.

The welding or gluing of the foils to each other and the gluing of the foils and the sliding tube to the protective compound prevents migration of the foils and the sliding tube through micro-movements. Such displacements can cause tensions inside the protective compound, which can adversely affect the measuring accuracy of the FBG. Such micro-movements result under conditions of periodically occurring mechanical forces and in the case of temperature fluctuations.

According to another advantageous feature of the invention multiple optical fibers are fixed between the fastening elements. This enables a cascade-like arrangement of multiple adjacently arranged FBG in a single very compact component, which can be applied well. Multiple arrangements are often used in the measuring technology on order to be able to rely on a further functioning measuring channel in case of failure of an FBG sensor.

BRIEF DESCRIPTION OF THE DRAWING

In the following, the invention is explained in more detail by way of examples in connection with schematic drawings.

FIG. 1b shows the side view of FIG. 1a.

FIG. 1f shows the FBG sensor according to FIG. 1d on a curved material surface.

FIG. 1g shows the FBG sensor according to FIG. 1f in the case of a material surface undergoing strain.

DETAILED DESCRIPTION OF PREFERRED EMBODIMENTS

Figure 1A:
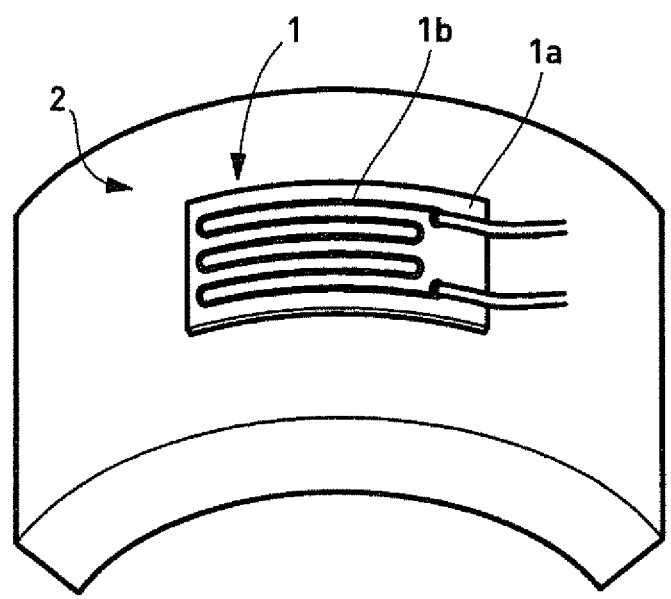
FIG. 1a shows a conventional metal foil DMS on a curved material surface

FIG. 1a shows a perspective view of a conventional metal foil DMS 1 on a curved material surface 2, for example a pipe or a pressure vessel. A metal foil DMS 1 consists essentially of a plastic carrier foil 1a, on which at least one thin meander-shaped metal foil strip 1b is fastened over its entire surface. For detecting the strain, the plastic carrier foil 1a is glued onto the material surface 2.

Figure 1B:
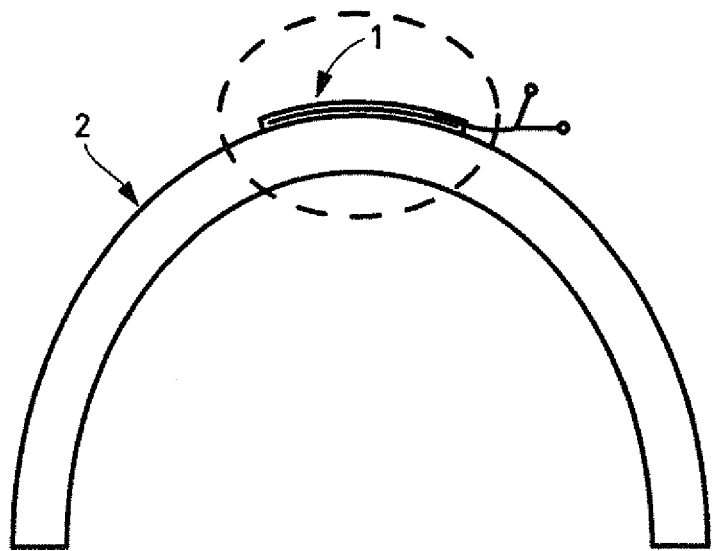
Figure 1C:
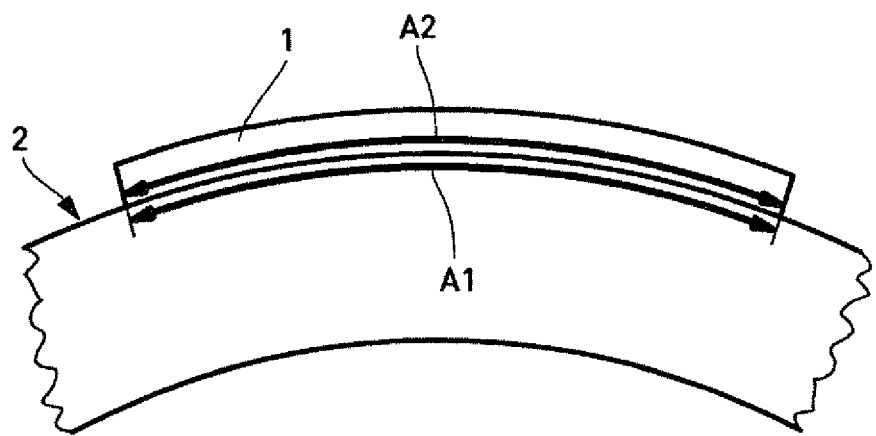
FIG. 1c shows an enlarged section of FIG. 1b.

FIG. 1b shows the side view of FIG. 1a, and FIG. 1c shows an enlarged section of FIG. 1b. When the material undergoes strain, as indicated with the strain arrow A1 in FIG. 1c, this strain is transmitted evenly to the carrier foil 1a due to the full-surface gluing, and as a result of the full-surface connection of the metal foil 1b with the carrier foil 1a the metal foil 1b is strained. Insofar the material strain of the material surface 2 is transmitted almost error-free to the metal foil strip 1b, which is indicated with the same size strain arrow A2. This almost error-free transmission of the strain applies to even surfaces in the same manner as to curved surfaces.

In contrast to this, in case of an FBG sensor the strain is not transmitted over the entire application surface, which is explained in more detail in the following.

Figure 1D:
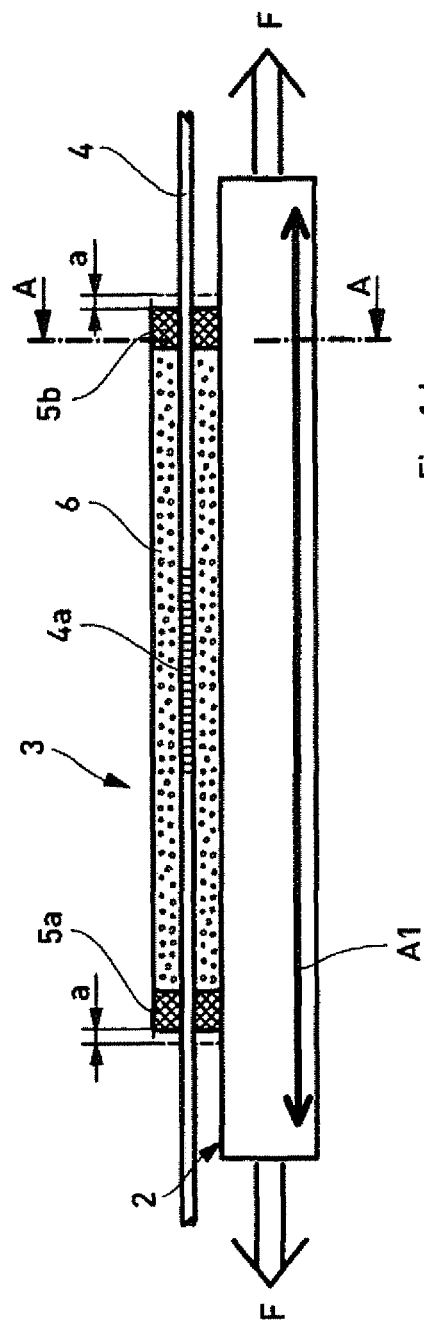
FIGS. 1d-1e show an FBG sensor in longitudinal and cross section.
Figure 1E:
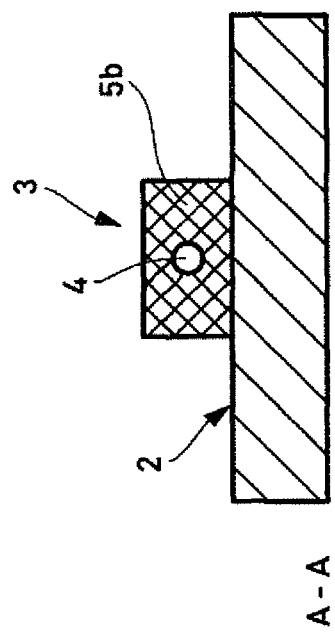

FIGS. 1d and 1e show a longitudinal section and cross section of an FBG sensor 3 according to the document WO 2008/1017657 A1, which is constructed as follows: a glass fiber 4 with an FBG 4a is held between two rigid fastening elements 5a, 5b and is embedded in a soft plastic 6, for example a silicone rubber. The two rigid fastening elements 5a, 5b are glued onto the material surface 2 to be investigated and can consist of interconnected glass fiber leaves soaked with a phenol resin. The soft silicone rubber 6 serves for protecting the section of the optical fiber 4 with the FBG 4a against interfering forces, i.e., for example lateral forces, and for improving handling of the FBG sensor 3 during application. When forces act on the material to be investigated and the material and with this the even material surface 2 undergo strain by the lengths a+a, this strain is also transmitted almost error-free to the FBG sensor 3 as in the case of the metal foil strain strip.

However, when an FBG sensor 3 with this construction is used for measuring strain on a curved surface, effects occur which lead to greater measuring errors, which is explained in the following by way of FIGS. 1f and 1g.

FIG. 1f shows the FBG sensor applied onto a curved material surface 2. Because the optical fiber 4 is very thin and with this very flexible and the silicone rubber 6 also adapts well to the radius of curvature of the material surface 2, FBG sensors 3 with this construction can be applied well also on strongly curved surfaces.

FIG. 1g shows the situation when this material surface 2 undergoes strain which is symbolized with the arrows below the curved material wall.

The double arrow indicates the strain of the material surface. However, because the fiber 4 is only clamped in the two fastening elements 5a, 5b it moves toward the material surface and is pressed into the silicone rubber. This movement is symbolized with the small arrows. The transverse forces acting thereby on the FBG 4a falsify the measuring result. In addition, due to this movement the actual strain of the material surface is transmitted only incompletely to the FBG 4a thus resulting in a further measuring error, which depends on the radius of curvature of the material surface. It was therefore found that neither with a sensor according to JP 2003 279760 nor with a sensor according to WO 2008/101657 A1 accurate strain measurements on curved surfaces are possible.

These two causes for measuring errors however are eliminated with the FBG sensor according to FIGS. 2a to 2e according to the invention.

Figure 2A:
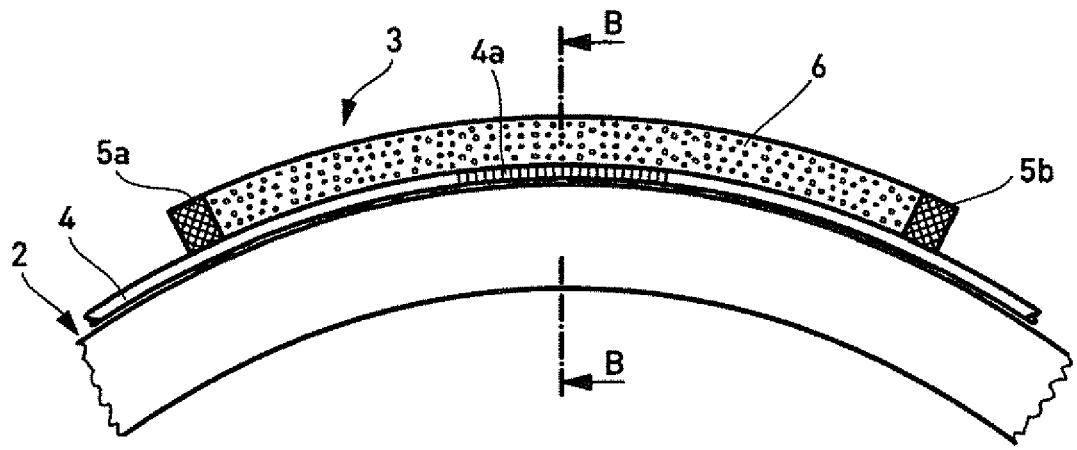
FIG. 2a shows the longitudinal section of an FBG sensor according to a first embodiment of the invention.
Figure 2B:
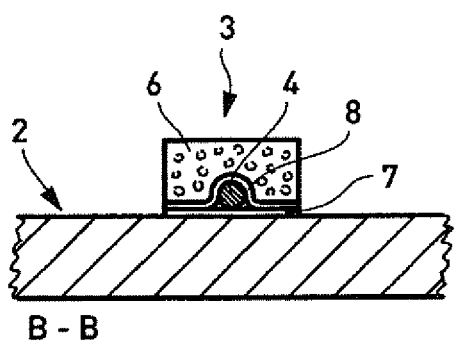
FIG. 2b shows a first embodiment of the FBG sensor according to the invention in cross section.

FIG. 2a shows the longitudinal section of the FBG sensor 3 according to a first embodiment of the invention. The principle construction and function of the FBG sensor 3 are described in connection with the cross sectional representation of FIG. 2b.

The optical fiber 4 is glued between the fastening elements 5a, 5b and each fastening element is glued to the material surface 2. Further, the optical fiber 4 is embedded between two sliding foils 7 and 8. These two foils are made for example of Teflon, are welded together at their borders and form a sliding bearing for the fiber 4. The sliding foil, which in the instant case is 0.15 mm thin, rests directly on the material surface 2, i.e., the bottom side of the sliding foil 7, lies in the same plane as the adhesive surfaces of the fastening elements 5a, 5b. Because the sliding foil 7 due to its properties and its small thickness is only compressed to a negligible degree when the fiber 4 is tensioned, the measuring error described in FIG. 1g does not occur or is negligible. In addition, because the fiber 4 is covered from above by a sliding foil, no slip-stick effects occur as a result of the influence of the soft plastic 6.

Figure 2C:
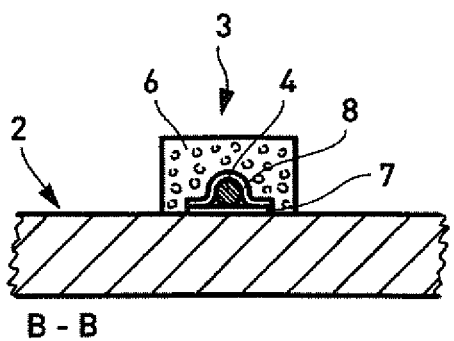
FIG. 2c shows a second embodiment of the FBG sensor according to the invention in cross section.
Figure 2D:
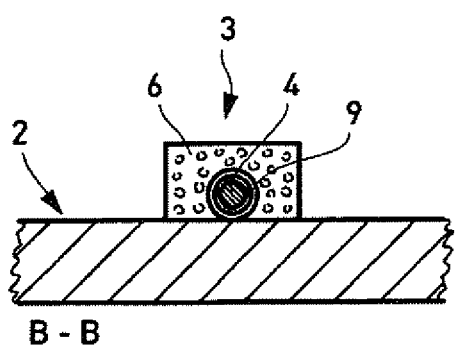
FIG. 2d shows a third embodiment of the FBG sensor according to the invention in cross section.

The embodiments according to FIGS. 2c and 2d have the same function. The embodiment according to FIG. 2c shows that the soft plastic 6 protrudes over the borders of the sliding foils 7, 8 and with this results in a very effective sealing against moisture, which may otherwise be able to enter underneath the sensor as a result of capillary action, which would lead to measuring errors under freezing conditions. In the embodiment according to FIG. 2d a soft-elastic tube 9 is used instead of the foils 7, 8. This is a preferred embodiment of the invention because it can be produced easily and reliably.

Foils and tube material can include any plastics which can be described as soft-elastic and which have a very smooth surface, such as Teflon or silicone.

Figure 2E:
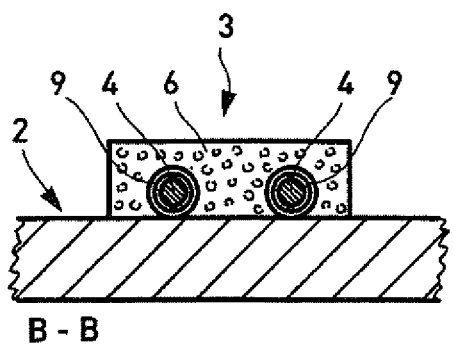
FIG. 2e shows a fourth embodiment of the FBG sensor according to the invention in cross section.

In the embodiment according to FIG. 2e two optical fibers 4 are glued between the fastening elements 5a, 5b and are embedded in the plastic 6. Such multi-sensors are used for example to reduce the likelihood of failure of measurement chains.

Figure 3A:
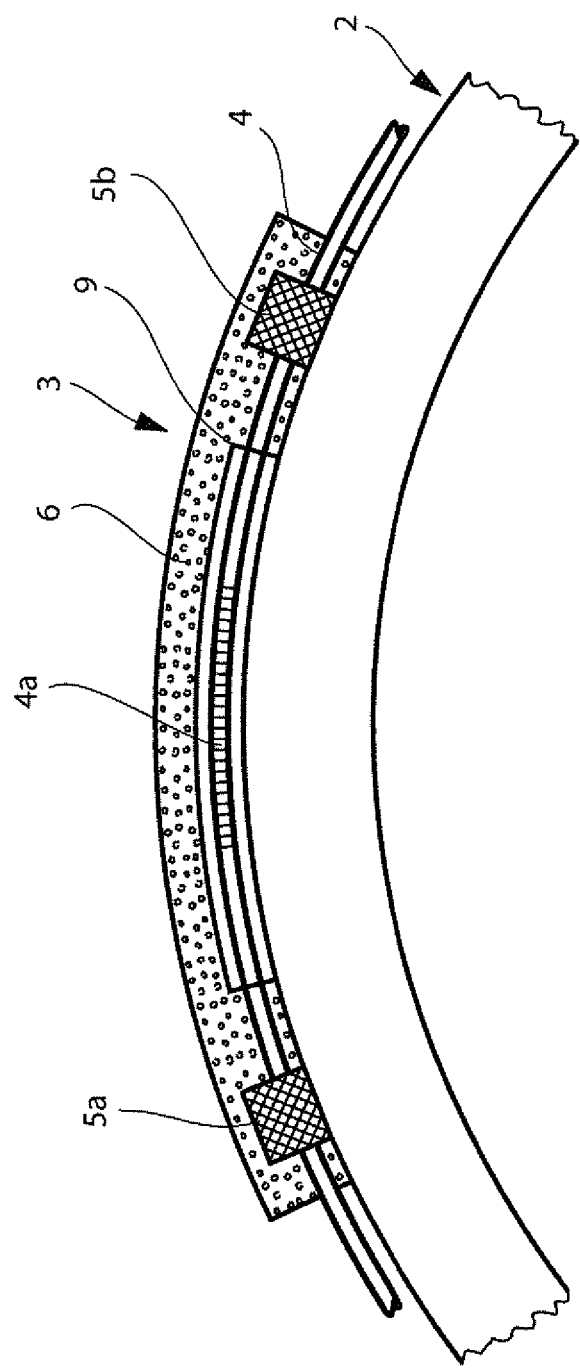
FIG. 3a shows the longitudinal section of an FBG sensor according to a second embodiment of the invention.

FIG. 3a shows the longitudinal section of the FBG sensor 3 according to a second embodiment of the invention. The optical fiber 4 and the fastening elements 5a, 5b are embedded in a protective compound 6 made of a soft silicone rubber or a plastic with comparable mechanical properties. The fiber 4 is enclosed with a thin sliding tube 9 made of Teflon or a plastic with low friction coefficient comparable to that of Teflon, wherein the lower external surface-line of the sliding tube 9 lies in a plane with the adhesive surfaces.

What is claimed is:

1. An FBG sensor, comprising:
    two fastening elements, each having an adhesive bottom surface;
    an optical fiber fixed between the two fastening elements;
    a protective compound made of a soft silicone rubber or a plastic with comparable mechanical properties, with the optical fiber and the fastening elements being embedded in the protective compound; and
    a thin sliding tube of constant diameter made of Teflon or a plastic with low friction coefficient comparable to that of Teflon enclosing the optical fiber, wherein only a bottom side of the thin sliding tube lies in one plane with the adhesive surfaces of the fastening elements,
    wherein the sliding tube is glued together with the protective compound.

2. The FBG sensor of claim 1, further comprising multiple said optical fiber, wherein the multiple optical fibers are fixed between the fastening elements.

* * * * *